(12) United States Patent
Mottier et al.

(10) Patent No.: US 7,356,008 B2
(45) Date of Patent: Apr. 8, 2008

(54) METHOD OF ASSIGNING ONE OR MORE SPREADING SEQUENCES TO USERS OF A MULTI CARRIER TRANSMISSION NETWORK

(75) Inventors: David Mottier, Rennes Cedex (FR); Thomas Salzer, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 499 days.

(21) Appl. No.: 10/922,939

(22) Filed: Aug. 23, 2004

(65) Prior Publication Data
US 2005/0111348 A1 May 26, 2005

(30) Foreign Application Priority Data
Sep. 1, 2003 (EP) .................. 03292148

(51) Int. Cl.
H04B 7/216 (2006.01)
(52) U.S. Cl. .................. 370/335; 370/320; 370/342
(58) Field of Classification Search .......... 370/320, 370/335, 342
See application file for complete search history.

(56) References Cited

U.S. PATENT DOCUMENTS

| 6,542,484 | B1 | 4/2003 | Ovesjo et al. | |
|---|---|---|---|---|
| 7,206,608 | B1* | 4/2007 | Wu et al. | 455/562.1 |
| 2002/0146060 | A1* | 10/2002 | Ertel et al. | 375/130 |
| 2004/0081113 | A1* | 4/2004 | Earnshaw et al. | 370/320 |
| 2005/0030925 | A1* | 2/2005 | Salzer | 370/334 |

FOREIGN PATENT DOCUMENTS
EP 1 085 689 B1 3/2001

OTHER PUBLICATIONS

Yu-Chee Tseng, et al., "Code Placement and Replacement Strategies for Wideband CDMA OVSF Code Tree Management", IEEE, vol. 1, Nov. 2001, pp. 562-566.
U.S. Appl. No. 10/922,939, filed Aug. 23, 2004, Mottier et al.
U.S. Appl. No. 10/964,930, filed Oct. 15, 2004, Mottier.
U.S. Appl. No. 10/924,982, filed Aug. 25, 2004, Mottier et al.
Qinghua Shi, et al., "Simple Spreading Code Allocation Scheme for Downlink MC-CDMA", Electonic Letters vol. 38, No. 15, Jul. 18, 2002.
David Mottier, et al., "A Spreading Sequence Allocation Procedure for MC-CDMA Transmission System", IEEE VTS Fall VTC2000, 52$^{nd}$ Vehicular Technology Conference, pp. 1270-1275, Boston Ma. Sep. 24-28, 2000.

* cited by examiner

*Primary Examiner*—Barry Taylor
(74) *Attorney, Agent, or Firm*—Oblon, Spivak, McClelland, Maier & Neustadt, P.C.

(57) ABSTRACT

A method of assigning one or more spreading sequences to users of a Multi Carrier transmission network, each element of the spreading sequence being, at a transmitter of the network, multiplied by a data item to be transmitted and then transmitted on a corresponding sub-carrier. The method includes obtaining spatial information for each user of the Multi-Carrier transmission network, putting the users in order according to their spatial information, and assigning at least a spreading sequence among a group of ordered spreading sequences to each user according to its order.

16 Claims, 5 Drawing Sheets

METHOD OF ASSIGNING ONE OR MORE SPREADING SEQUENCES TO USERS OF A MULTI CARRIER TRANSMISSION NETWORK

BACKGROUND OF THE INVENTION

1. Field of the Invention

The present invention concerns a method of assigning one or more spreading sequences to users of a Multi-Carrier transmission network, such as a Multi-Carrier Code Division Multiple Access transmission network, better known by the name MC-CDMA network or an Orthogonal Frequency and Code Division Multiplexing transmission network, better known by the name OFCDM.

1. Discussion Of The Background

MC-CDMA has been receiving widespread interest for wireless broadband multimedia applications. Multi-Carrier Code Division Multiple Access (MC-CDMA) combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

Unlike DS-CDMA (Direct Sequence Code Division Multiple Access), in which the signal of each mobile terminal or user is multiplied in the time domain in order to spread its frequency spectrum, the signature here multiplies the signal in the frequency domain, each element of the signature multiplying the signal of a different sub-carrier.

In general, MC-CDMA combines the advantageous features of CDMA and OFDM, i.e. high spectral efficiency, multiple access capabilities, robustness in presence of frequency selective channels, high flexibility, narrow-band interference rejection, simple one-tap equalisation, etc.

A MC-CDMA base station transmitter transmits a plurality of symbols to a plurality K of users or more precisely to the mobile terminal of users. For example, a MC-CDMA transmitter located in a base station of a MC-CDMA transmission system transmits symbols to a plurality of users over a plurality of downlink transmission channels.

A complex symbol to be transmitted from the base station to user k is first multiplied by a spreading sequence denoted $c_k$. The spreading sequence consists of L "chips", each "chip" being of duration $T_c$, the total duration of the spreading sequence corresponding to a symbol period T. In order to mitigate intra-cell interference, the spreading sequences are chosen orthogonal.

The result of the multiplication of the complex symbol by the elements of the spreading sequence for user k gives L complex values that are added to the similar values to be transmitted to the other users k'≠k. These values are then demultiplexed over a subset of L frequencies of an OFDM multiplex, then subjected to an Inverse Fast Fourier Transformation (IFFT). In order to prevent intersymbol interference, a guard interval of length typically greater than the duration of the impulse response of the transmission channel, is inserted in front of to the symbol outputted by the IFFT module. This is achieved in practice by adding a prefix (denoted Δ) identical to the end of the said symbol. The resulting symbol is then filtered and transmitted by the base station to a plurality of users.

The MC-CDMA method can essentially be regarded as a spreading in the spectral domain (before IFFT) followed by an OFDM modulation.

It is known that the propagation channel can be obstructed by houses and other obstacles situated between the transmitter and the receiver. The transmitted signal is then propagated on multiple paths, each path being delayed and attenuated differently. It should be understood that the propagation channel then acts as a filter whose transfer function varies with time.

The ability of MC-CDMA transmission networks to provide orthogonality between the signals of the different users in the network (and therefore to prevent any interference between these signals) depends on the intercorrelation properties of the spreading sequences which are assigned to the users of the network.

Typically, in the case of transmissions on a mobile radio channel from a base station to a set of mobile stations called hereinafter users or active users, the signals intended for each user are transmitted synchronously. Under these conditions, Walsh-Hadamard spreading sequences can be used to guarantee orthogonality between the users if the channel is not frequency selective.

In the European patent EP 1085689 it is disclosed a method of assigning one or more spreading sequences to a user of a MC-CDMA transmission network, wherein a spreading sequence is assigned to a user taking into account a predetermined set of spreading sequences. More precisely, the predetermined set of spreading sequences consists in the spreading sequences which minimize a function representing the interference between the spreading sequence and the spreading sequences of the said predetermined or given set.

Such method which makes it possible to reduce the effects of the interference on the performance of the transmission network under consideration needs long calculation in order to define the predetermined set of spreading sequences. Furthermore, such method doesn't take into account new technique such as adaptive antenna arrays also referred to as intelligent antennas or smart antennas.

The two main factors that make mobile radio reception difficult is the presence of multipath fading and co-channel interference. The use of smart antennas can improve performance in these hostile environments. Smart antennas can be broadly classified into two categories, namely the phased array and the diversity array.

A phased array consists of a set of antenna elements that are spatially distributed at known locations with reference to a common fixed point. By changing the phase and amplitude of the exciting currents in each of the antenna elements it is possible to create gains and nulls in any direction. The signals received in these elements are typically combined at baseband using complex weights. Adaptive algorithms can be used to adapt the weights based on some optimisation criteria such as maximization of output Signal to Noise Ratio. In such a system the antenna response is maximised in the direction of the desired user and minimized it in the direction of the interferer. The radiation pattern of the array is determined by the radiation patterns of the individual elements, their orientation in space and the amplitude and phase of the feeding currents.

Beamforming is the process of forming beams towards the direction of the desired user while simultaneously suppressing signals originating from other directions.

SUMMARY OF THE INVENTION

The aim of the invention is therefore to propose a method which makes it possible to reduce the effects of the interference on the performance of the transmission network under consideration using simple spreading sequence allocation techniques.

To that end, the present invention concerns a method of assigning one or more spreading sequences to users of a Multi-Carrier transmission network, each element of the said spreading sequence being, at a transmitter of the said network, multiplied by a data item to be transmitted and then transmitted on a corresponding sub-carrier, characterised in that the method comprises the step of obtaining, for each user of the Multi-Carrier transmission network, spatial information, putting in order the users according to the spatial information and assigning to each user according to its order at least a spreading sequence among a group of ordered spreading sequences.

According to still another aspect, the present invention concerns a device for assigning one or more spreading sequences to users of a Multi-Carrier transmission network, each element of the said spreading sequence being, at a transmitter of the said network, multiplied by a data item to be transmitted and then transmitted on a corresponding sub-carrier, characterised in that the device comprises means for obtaining for each user of the Multi-Carrier transmission network spatial information, means for putting in order the users according to their spatial information and means for assigning to each user according to its order at least a spreading sequence among a group of ordered spreading sequences.

Thus, user spatial information permit to the present invention to get some knowledge about possible interferences which may occur or not on the transmission network. The fact that users are put in order according to their spatial information is an efficient and simple way to classify users according to an order showing the spatial proximity of their signals. Finally, the assignment to each user according to its order of a spreading sequence among a group of ordered spreading sequences permit to assign to users spreading sequences which reduce a lot interferences which occur in the transmission channel.

According to a particular feature, the spatial information is the spatial information of the signals transmitted to each user using a plurality of antennas or the signals received from each users using the plurality of antennas.

Thus, thanks to the plurality of antennas, it is possible to transmit signals to a group of users among the users of the Multi-Carrier transmission network without interfering with the signals transmitted to other users of the Multi-Carrier transmission network.

According to a particular feature, users require different length of spreading sequences and users requiring the same length of spreading sequences are grouped and put in order according to their spatial information.

Furthermore, the assignment of a spreading sequence to each user is made according to the group of users requiring the same length of spreading sequence he belongs to, according to the length of spreading sequence and according to its order within the group of users he belongs to.

Thus, by grouping users requiring the same length of spreading sequences it is much more easy to manage the assignment of the following spreading sequences. In fact, short spreading sequences may be included at the beginning of longer spreading sequences of the group of ordered spreading sequences and these longer sequences have not to be assigned to other users in order to reduce interferences.

By grouping the users so, such treatment of longer sequences which start by short spreading sequences is simplified.

According to a particular feature, at least one common sequence is assigned to a plurality of users, the one or each common sequence being assigned being the first spreading sequences of the ordered spreading sequences of the same length.

By virtue of that feature, it is possible to use common sequences for the broadcast of information to users and inventor found that if the first spreading sequences of the ordered spreading sequences are assigned as common sequences, information transmitted by these common sequences are more protected against interferences. This is particularly interesting because these common sequences are addressed to all users or at least a part of all users and because data items transmitted using these common sequences are generally representative of control information.

According to a particular feature, spatial information is the average direction of departure of the signals transmitted to each user or the maximum direction of departure of the signals transmitted to each user or information obtained from the antenna lobe diagram used to each user or information obtained from a Global Positioning System.

Thus, if some channel differences exist between a transmission channel and reception channel, the spatial information taken into account for the ordering of users avoid errors which may be generated by such differences. The directions of departure of the signals transmitted to each user are in such case different from the direction of arrival of the signals transmitted by each users.

Also, spatial information obtained from a Global positioning System avoid any estimation of the direction of departure of the signals transmitted to each user. As the spatial information is directly provided by the system, no calculation are needed.

According to a particular feature, the spreading sequence is a Walsh-Hadamard sequence and the group of ordered spreading sequences is a Walsh-Hadamard matrix whose lines or columns are in a natural order.

Thus, the assignment of spreading sequences to users is simple, no special calculations are needed. The complexity of the method or the device implementing the invention is then reduced a lot. Furthermore, such group of ordered spreading sequences reduce a lot interferences.

According to a particular feature, a predetermined common spreading sequence is assigned to the plurality of users and the lines or columns of Walsh Hadamard matrix are multiplied element by element by said predetermined common spreading sequence to form the group of ordered spreading sequences.

Thus, despite a predetermined spreading sequence has to be allocated to common signals, it is still possible to simply assign to each user according to its order, at least a spreading sequence among a group of ordered spreading sequences.

According to a particular feature, the group of ordered spreading sequences is formed by minimizing a cost function representing the interference between a spreading sequence of tuples of spreading sequences of a length able to satisfy the requirement of users and sequences belonging to the tuples of spreading sequences of the length able to satisfy the requirement of users.

Thus, interferences which occur in the transmission channel are reduced.

According to another particular feature, tuples of spreading sequences are defined from subsets of spreading sequences of a length able to satisfy the requirement of users and tuples are further defined according to users spatial information.

By using users spatial information in order to define the tuples of spreading sequence, the spreading sequences comprised within the subset of spreading sequences is reduced. Such reduction avoids to take into account an interference between spreading sequences that won't interfere each other in practice when they are assigned to users whose signals have different spatial information.

Furthermore, an interference is obtained for each subset of spreading sequences of a length able to satisfy the requirement of users, the interference for a subset being function of the interferences calculated for each tuples of the subset of spreading sequences of a length able to satisfy the requirement of users and the subset of spreading sequences having the smallest interference among the interference of the subsets is the group of ordered spreading sequences.

More precisely, the interference obtained for each subset of spreading sequences of a length able to satisfy the requirement of users is the maximum of the interferences calculated for each tuples of the subset of spreading sequences of a length able to satisfy the requirement of users.

According to a particular feature, the assignment is a dynamic assignment and the Multi-Carrier transmission network is an Orthogonal Frequency and Code Division Multiplexing transmission Network.

According to another particular feature, the assignment is a dynamic assignment and the Multi-Carrier transmission network is a Multi-Carrier Code Division Multiple Access transmission Network.

According to still another aspect, the present invention concerns a computer program which can be directly loadable into a programmable device, comprising instructions or portions of code for implementing the steps of the method according to the invention, when said computer program is executed on a programmable device. Since the features and advantages relating to the computer program are the same as those set out above relating to the method and device according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which:

FIG. 7 is an example of a Walsh-Hadamard matrix used in the second, third and fourth embodiments;

FIG. 8 is an example of a Walsh-Hadamard matrix formed by a multiplication of the Walsh-Hadamard matrix of the FIG. 7 by an imposed common spreading sequence.

DETAILED DESCRIPTION OF THE INVENTION

In a Multi-Carrier transmission network such as a MC-CDMA transmission network or an OFCDM transmission network, it is assigned to users, either at the instant of the initiation of a call, or regularly during communication, one or more spreading sequences, each element of which, at the transmitter of the network, is multiplied by a data item to be transmitted so as to control a modulator operating on a corresponding sub-carrier as has already been explained in the introduction to the present description.

The present invention consists of putting in order the active users according to spatial information and assigning to each of the users this spreading sequence or these spreading sequences among a set of spreading sequence put into a certain order taking into account the order of users.

Figure 1:
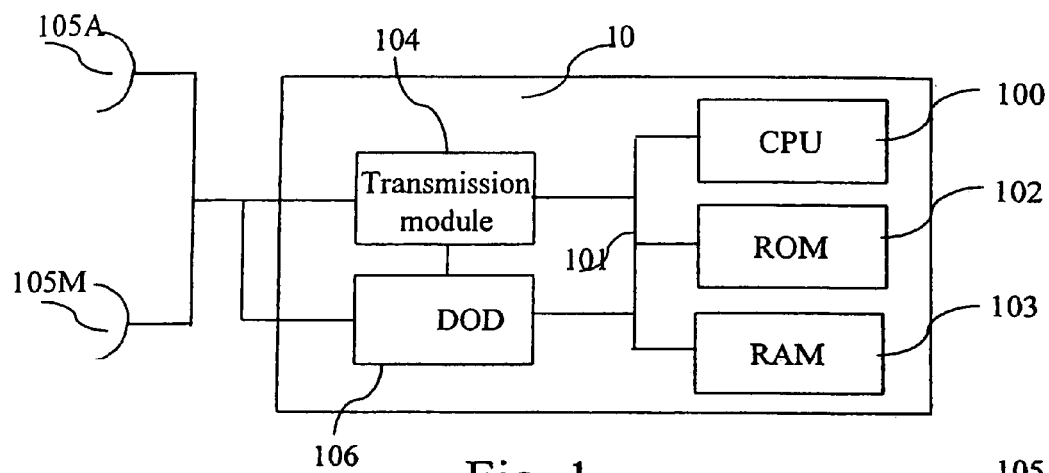
FIG. 1 is a block diagram of an example of a base station of a Multi-Carrier transmission network.

FIG. 1 is a block diagram of an example of a base station of a Multi-Carrier transmission network.

The base station 10 of the Multi-Carrier transmission network comprises a processor 100 linked by a bus 101 to a ROM memory 102, a RAM memory 103, a unit for determining user's spatial information 106 and a Multi-Carrier transmission module 104.

The controller or the processor 100, on powering up or when the base station is activated, loads the programs contained in the read only memory 102 and control the activation of the different elements described previously. It also controls the transfer of information between the different elements by virtue of the bus 101.

Regularly or each time a new active user is registered on the Multi-Carrier base station or each time an active user becomes inactive or anytime one or more users need new requirement in term of spreading sequence, the processor 100 executes the instructions associated to the algorithm described in the FIG. 3 or FIG. 4 or FIG. 5 or FIG. 6 allowing then a dynamic assignment of spreading sequences to users.

The non-volatile memory ROM 102, contains the instructions of the programs implementing the instructions of the algorithms as described in FIG. 3, 4, 5 and 6 as well as the conventional algorithms of a base station.

The ROM memory 102 includes also one or several group of ordered spreading sequences.

The RAM memory 103 contains the variables or temporary data necessary for the operation of the device 10 and enabling the invention to be implemented.

The unit for determining user's spatial information 106 defines the user's spatial information using signature of the channel. The unit for determining user's spatial information 106 is connected to M antennas 105 which transmit/receive the signal from/to different directions. The unit for determining user's spatial information 106 determines a complex weighting coefficient associated with a user k, a frequency component, an antenna. The complex weighting coefficient is used by the antenna array to form a transmit/receive beam for the frequency component of the user k.

The complex weighting coefficients are applied both in the space domain (for a given subcarrier, they can be regarded as forming a beam for user k) and in the frequency domain (for a given antenna, the complex weighting coefficients can be regarded as those of conventional frequency filter).

The unit for determining user's spatial information 106 delivers to the processor 100 the spatial information and more precisely the average direction of departure of the signals transmitted to each user or it puts in order active users on the basis of the average direction of departure of the signals transmitted to each user.

Spatial information can be also, instead of the average of direction of departure, the direction of the beam having the maximum of amplitude or the direction of departure of the propagation path having the maximum amplitude.

It has to be noted here that other types of spatial information can be used in the present invention.

Spatial information can also be obtained from a Global Positioning System.

Spatial information can also be obtained from an algorithm of antenna lobe allocation to users. The spatial information being here the direction of the antenna lobe allocated to respective users.

Spatial information can be also determined on the basis of the direction of arrival of the signals transmitted by each active users or an average or a maximum direction of arrival of the signals transmitted to each user.

The Multi-Carrier transmission module 104 is connected to a plurality of antennas 105A to 105M, it will be described in detail in reference to FIG. 2.

Figure 2:
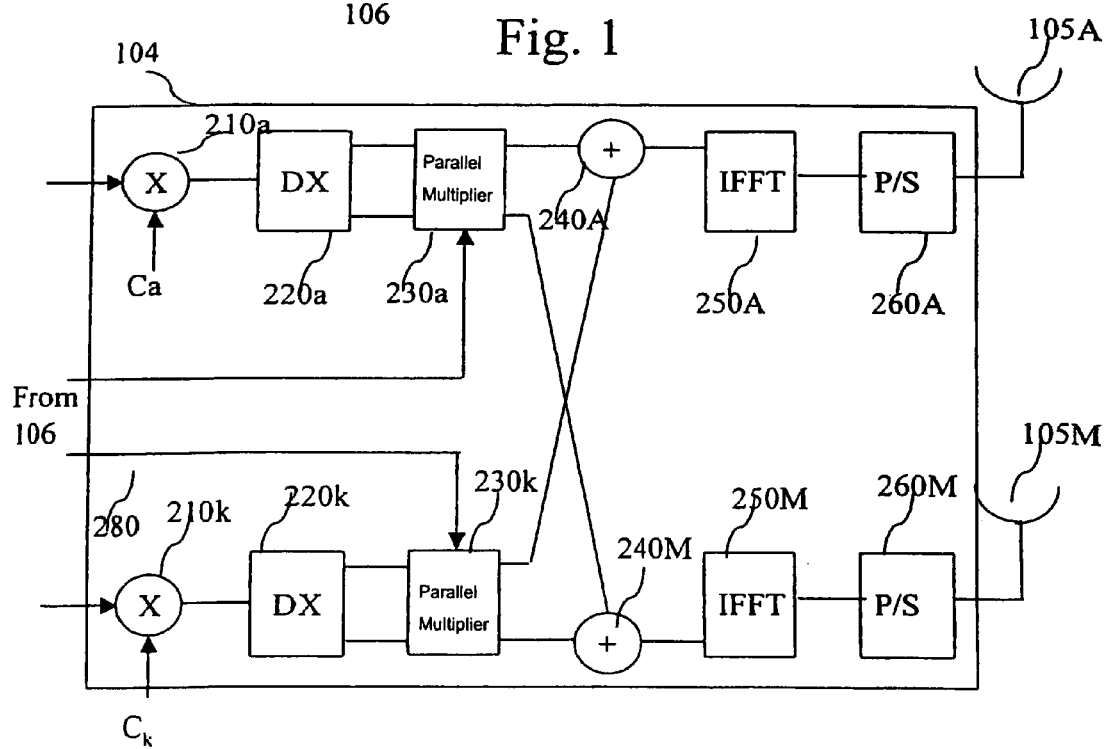
FIG. 2 is block diagram of a Multi-Carrier transmission module according to the invention.

FIG. 2 is a block diagram of a Multi-Carrier transmission module according to the invention.

The multi-carrier transmission module 104 is more precisely a MC-CDMA transmission module.

The transmitter comprises k identical branches, each branch corresponding to a given active user. The branch dedicated to user k comprises a multiplier 210k, a demultiplexer 220k and a parallel multiplier 230k connected in series. For example, the branch dedicated to user a illustrated in the upper part of the FIG. 2 comprises a multiplier 210a for multiplying the complex value comprising the symbol to be transmitted to user a by a spreading sequence Ca determined by the algorithms described in FIG. 3, or FIG. 4 or FIG. 5 or FIG. 6, a demultiplexer 220a for serial-to-parallel conversion of the spread complex values, a parallel multiplier 230a for multiplying each of the spread complex values with components of a complex weighting vector defined by the unit for determining user's spatial information 106.

For a given user, for instance user k, the complex weighting vector corresponds to the weighting coefficients for antennas 105, user k and subcarriers.

The MC-CDMA transmitter is further provided with a plurality M of adders 240A, . . . , 240M, each adder 240 adding the signal vectors output by the parallel multipliers 230a, . . . , 230k and supplying the resulting vectors to the modules 250A, . . . , 250M respectively. More precisely, each module 250 performs an inverse Fast Fourier Transform on the vector of compound frequency components and adds a prefix to the symbol thus obtained. After parallel-to-serial conversion in 260A, . . . 260M and a frequency up-conversion, not shown in FIG. 2, the resulting signal is transmitted by the antennas 105A, . . . 105M.

Thanks to such architecture, a beam is formed for each user according to its spatial information, or a beam can also be formed for a group of users if they have similar spatial information.

Figures 3, 4:
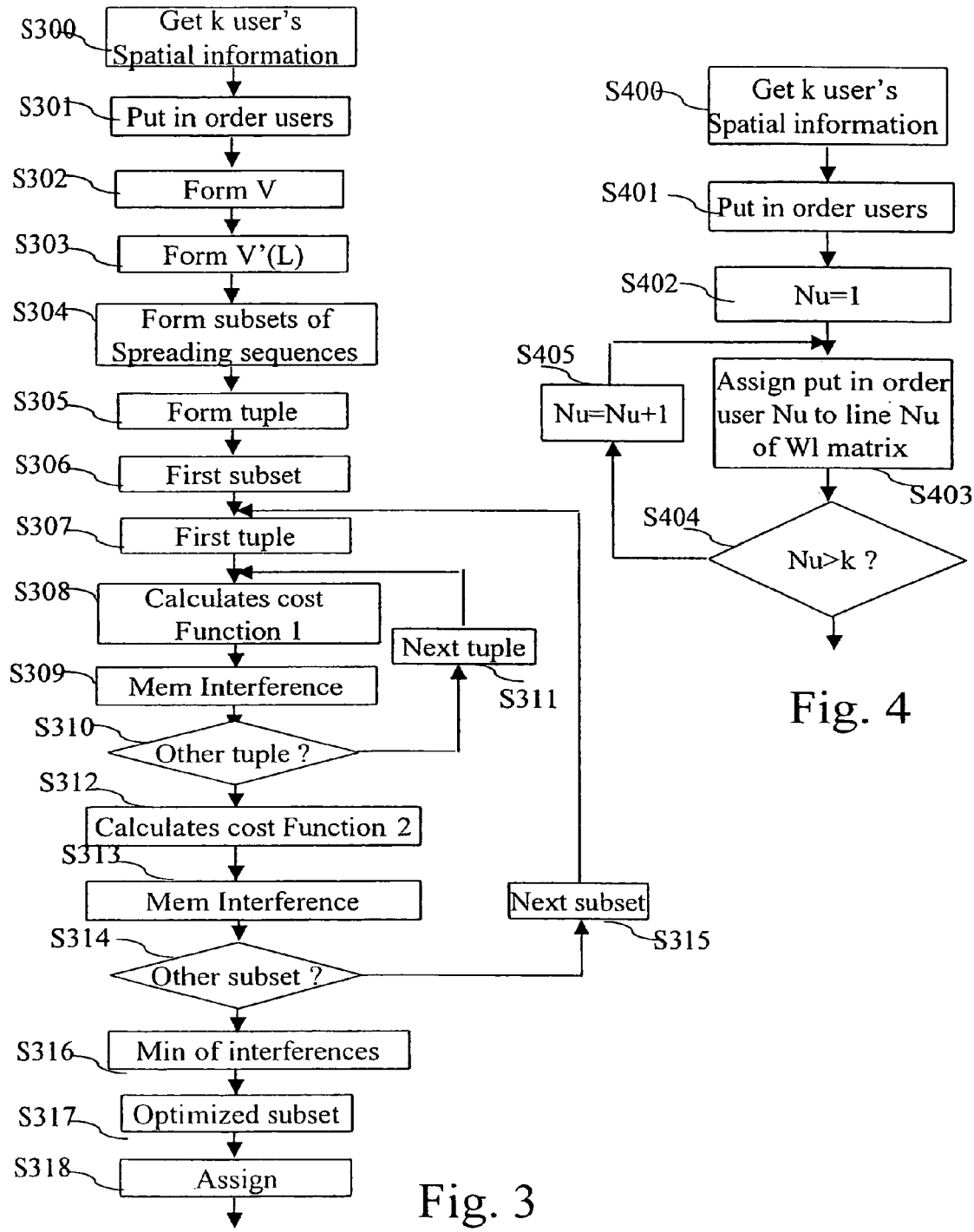
FIG. 3 is an algorithm for assigning one or more spreading sequences to each user of a Multi-Carrier transmission network according to a first embodiment of the present invention, implemented in the device of FIG. 1.
FIG. 4 is an algorithm assigning one spreading sequence to each user of a Multi-Carrier transmission network according to a second embodiment of the present invention, implemented in the device of FIG. 1.

FIG. 3 is an algorithm for assigning one or more spreading sequences to each user of a Multi-Carrier transmission network according to a first embodiment of the present invention, implemented in the device of FIG. 1.

The code of this flow chart is for example stored in the ROM memory 102 of the device of FIG. 1. When this device is powered up, the code is loaded into the random access memory 103 and executed by the processor 100 of the device 10.

Regularly or each time a new active user is registered on the Multi-Carrier base station or each time an active user becomes inactive or anytime one or more users have a new requirement in term of spreading sequence, the processor 100 executes the instructions associated to the algorithm described in the FIG. 3.

At step S300, the processor 100 receives from the unit for determining user's spatial information 106 the respective average direction of departure of the signals transmitted to each user.

As example, four users u1, u2, u3 and u4 are active in the Multi-Carrier network and the respective average direction of departure of the signals transmitted to each user are seven, one hundred twelve, eighty three and sixteen degrees.

Next step S301, the processor 100 puts in order the four actives users according to the respective average direction of departure of the signals transmitted to each user. The order is then u1, u4, u3 and u2.

At the following step S302, the processor 100 forms a vector V representing the ordered active users.

The dimension of the vector V is equal to the number of active users and the coefficients of the vector V represent each ordered user and their needs in term of length and number of spreading sequences assigned to each of the active users.

The vector V being formed, the processor 100 moves to step S303.

At that step, the processor 100 extends the vector V to at least one vector V'(L). A vector V'(L) includes the requirement of spreading sequences of length L needed for broadcast signals called hereinafter common signals followed by the set of requirement of spreading sequences of length L needed by all the ordered users.

In the Multi-Carrier network according to the invention, it can be assigned different length of spreading sequences to active users and/or it can be assigned several spreading sequences to at least one active user according to the needs.

As example, if each of the four active users u1, u2, u3 and u4 needs one spreading sequence of length L and no common signal is required, the vector V'(L) is identical to the previous vector V.

If two common signals of length L are required, a unique vector V' is formed and is equal to V'(L)=($s_{1,L}(c)$, $s_{2,L}(c)$, $s_{1,L}(v1)$, $s_{1,L}(v2)$, $s_{1,L}(v3)$, $s_{1,L}(v4)$ ) where v1 to v4 are the coefficient of vector V, $s_{i,L}(c)$ is the i-th sequence of length L for common information, $s_{i,L}(vj)$ is the i-th sequence of length L required by ordered user vj.

At next step S304, the processor 100 forms or read in the ROM memory 102 subsets of spreading sequences that are able to satisfy the requirements of active users and common signals. These spreading sequences are preferably a set of Walsh-Hadamard spreading sequences of length L allowing Orthogonal Variable Spreading Factors OVSF. The OVSF can have a length of L/2, L/4 and so on.

The spreading sequences are the lines or the columns of a Walsh-Hadamard matrix.

As example, a Walsh-Hadamard matrix of dimension four is:

$$W_{L=4} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Such matrix allows the assignment of four spreading sequences with a maximum length of four.

These spreading sequences can be also a set of spreading sequences as disclosed in the European Patent EP 1085689 or a set of spreading sequences as disclosed in the article of Qinghua Shi and M. Latva-aho "simple spreading code allocation scheme for downlink MC-CDMA published in Electronics Letters the 18$^{th}$ Jul. 2002.

It has to be noted that several subsets of spreading sequences may satisfy the users requirements.

At next step S305, the processor 100 partitions each subset of spreading sequences of length L formed in the previous step into several tuples of sequences of length L using the spatial information obtained from the unit for determining user's spatial information 106. Basically, these tuples gather sequences of the same length of distinct users having a similar spatial information. For instance, these subgroups of sequences may correspond to sequences needed to be transmitted in a specific beam of the antenna pattern.

Also, some sequences may belong to several tuples. It is particularly the case for sequences used for the transmission of common information that need to be transmitted in all spatial directions.

At next step S306, the processor 100 takes the first subset of spreading sequences of the subsets of the spreading sequences formed at step S304. Such subset is considered as the current subset.

At next step S307, the processor 100 takes the first tuple as a current tuple of the tuple formed at step S305.

At next step S308, the processor 100 calculates the cost function noted cost function 1 for the current tuple. As example, the cost function is the cost function as disclosed in the paper of Mottier and Castelain "A spreading sequence allocation procedure for MC-CDMA transmission systems" Proc IEEE VTC'2000, September 2000 vol 3, pp 1270-1275. It takes into account the maximal degradation that is experienced by two of the spreading sequences of the sequences of tuples formed at step S305.

At next step S309, the processor 100 memorizes the interference obtained according to the cost function.

At next step S310, the processor 100 checks whether of not if there are other tuple formed at step S305.

If there is at least one other tuple formed at step S305, the processor 100 moves to step S311 and takes another tuple.

The processor 100 executes steps S308 to S311 as far as there is no more tuple formed at step S305 to analyse.

When the interference obtained according to the cost function has been memorized for each of the tuple of the current subset, the processor 100 moves to step S312.

At that step, the processor 100 calculates, among the interferences of the interferences memorized at step S309, a cost function noted cost function 2 for the current subset. As example, the cost function is the maximum interference among interferences memorized at step S309.

At next step S313, the processor 100 memorizes the interference observed according to the cost function.

At the following step S314, the processor 100 checks whether of not if there are other subsets formed at step S304.

If there is at least one other subset formed at step S304, the processor 100 moves to step S315 and takes another subset.

The processor 100 executes steps S307 to S315 as far as there is no more subset formed at step S304 to analyse.

When the interference has been memorized for each of the subsets, the processor 100 moves to step S316.

At that step, the processor 100 determines the minimum interference among the interferences memorized at step S313.

It has to be noted here that the processor 100 can determine in a variant instead of the minimum of interference, the average of the interference calculated for each tuples of the subset.

At next step S317, the processor 100 set as optimised subset, the subset which has the minimum interference determined at step S316.

At next step S318, the processor 100 assigns to each element of the vector V'(L) according to its order a spreading sequence among the group of ordered spreading sequences of the optimised subset.

It has to be noted here that the optimised subset of spreading sequence can be also determined according to the technique as disclosed in the article of Qinghua Shi and M. Latva-aho "simple spreading code allocation scheme for downlink MC-CDMA" published in Electronics Letters the 18$^{th}$ Jul. 2002.

FIG. 4 is an algorithm for assigning one spreading sequence to each user of a Multi-Carrier transmission network according to a second embodiment of the present invention, implemented in the device of FIG. 1.

The code of this flow chart is for example stored in the ROM memory 102 of the device 10 of FIG. 1. When this device 10 is powered up, the code is loaded into the random access memory 103 and executed by the processor 100 of the device 10.

Such algorithm discloses a simplified method of the algorithm described in FIG. 3. The algorithm of FIG. 4 is executed by the processor 100 under certain circumstances like in a Multi-Carrier network where no Orthogonal Variable Spreading Factors and no common signals and no multi-code are needed.

Regularly or each time a new active user is registered on the Multi-Carrier base station or each time an active user becomes inactive or anytime one or more users have a new requirement in term of spreading sequence, the processor 100 executes the instructions associated to the algorithm described in the FIG. 4.

At step S400, the processor 100 receives from the unit for determining users spatial information 106 the respective average direction of departure of the signals transmitted to each user.

As example, four users u1, u2, u3 and u4 are active in the Multi-Carrier network and the respective average direction of departure of the signals transmitted to each user are seven, one hundred twelve, eighty three and sixteen degrees.

Next step S401, the processor 100 puts into order the four actives users according to their respective average direction of departure of the signals transmitted to each user. The order is then u1, u4, u3 and u2.

At the following step S402, the processor 100 set a variable Nu to one.

At next step S403, the processor 100 assigns to the Nu-th ordered active user the line Nu or the column Nu of a Walsh-Hadamard matrix. A line Nu or a column Nu of a Walsh-Hadamard matrix is the spreading sequence assigned to user Nu.

Following our example, the first line of the Hadamard-Hadamard matrix is then assigned to the first ordered user u1.

At the following step S404, the processor 100 checks whether or not the variable Nu is greater the number k of active users in the Multi-Carrier network.

If Nu is lower or equal to k, the processor 100 goes to step S405, increments the variable Nu and executes the loop made by steps S403 to S405 as far as Nu is greater than k.

Following our example, the second line of the Hadamard-Hadamard matrix is then assigned to the second ordered user u4, the third line of the Hadamard-Hadamard matrix is then assigned to the third ordered user u3 and the fourth line of the Hadamard-Hadamard matrix is then assigned to the fourth ordered user u2.

Figure 5:
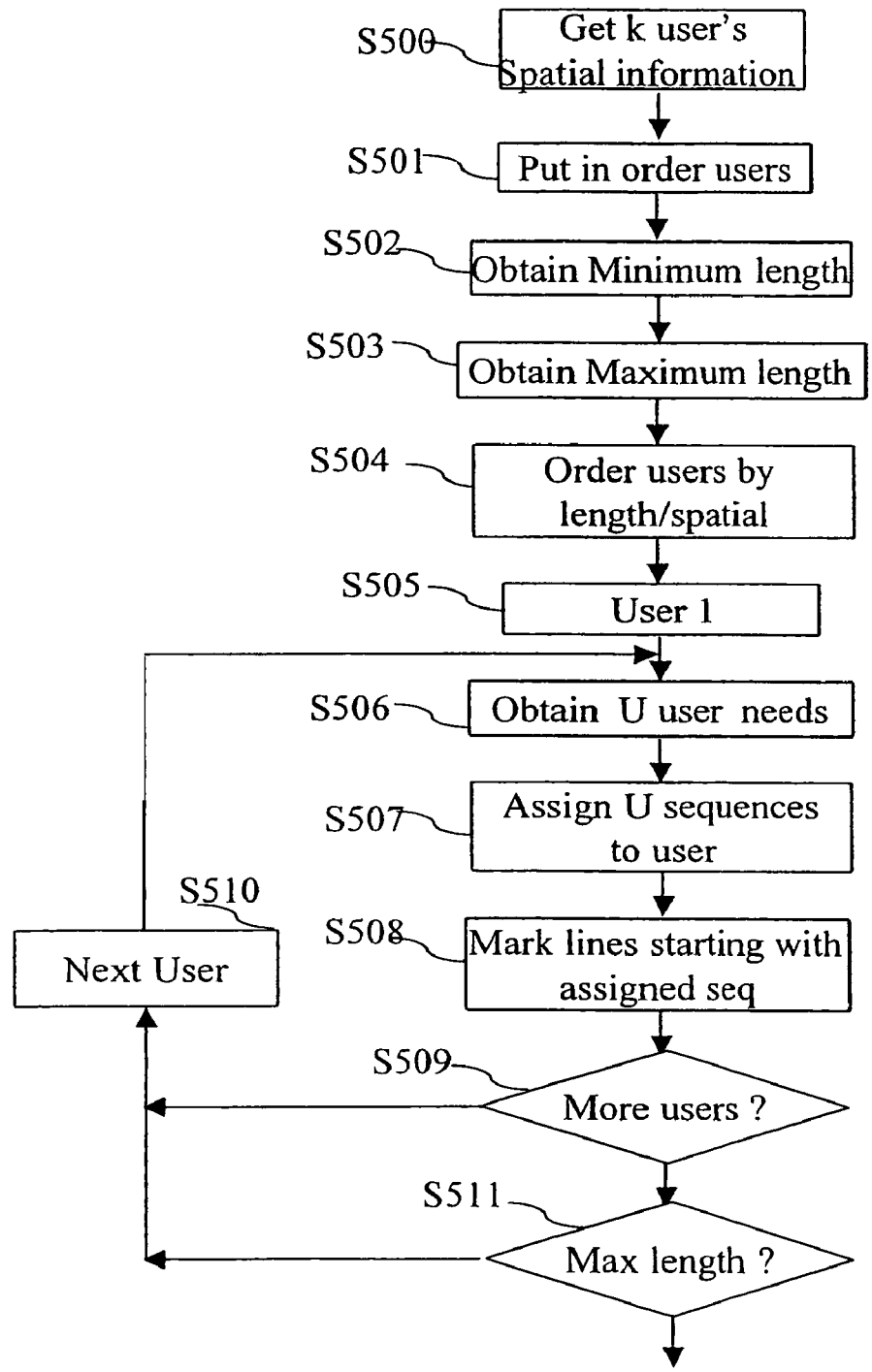
FIG. 5 is an algorithm for assigning one or more spreading sequences to each user of a Multi-Carrier transmission network according to a third embodiment of the present invention, implemented in the device of FIG. 1.

FIG. 5 is an algorithm for assigning one or more spreading sequences to users of a Multi-Carrier transmission network according to a third embodiment of the present invention, implemented in the device of FIG. 1.

The code of this flow chart is for example stored in the ROM 102 memory of the device 10 of FIG. 1. When this device 10 is powered up, the code is loaded into the random access memory 103 and executed by the processor 100 of the device 10.

Such algorithm is executed by the processor 100 under certain circumstances like in a Multi-Carrier network where Orthogonal Variable Spreading Factors, multiple spreading sequences are needed, but no common signals are needed.

Regularly or each time a new active user is registered on the Multi-Carrier base station or each time an active user becomes inactive or anytime one or more users have a new requirement in term of spreading sequence, the processor 100 executes the instructions associated to the algorithm described in the FIG. 5.

At step S500, the processor 100 receives from the unit for determining user's spatial information 106 the respective average direction of departure of the signals transmitted to each user.

As example, four users u1, u2, u3 and u4 are active in the Multi-Carrier network and their respective average direction of departure of the signals transmitted to each user are seven, one hundred twelve, eighty three and sixteen degrees. Users u1 and u4 need a spreading sequence of L/2 length, user u2 need a spreading sequence of length L and user u3 needs two spreading sequences of length L.

Next step S501, the processor 100 puts in order the four actives users according to their respective average direction of departure of the signals transmitted to each user. The order is then u1, u4, u3 and u2.

At next step S502, the processor 100 obtains the minimum length of required spreading sequences by the active users u1, u2, u3 and u4 put in order at step S501.

Following our example, the minimum length is required by users u1 and u4 and is equal to L/2.

At next step S503, the processor 100 obtains the maximum length of required spreading sequences by the active users u1, u2, u3 and u4 ordered at step S501.

Following our example, the maximum length is required by users u2 and u3 and is equal to L.

At next step S504, the processor 100 puts in order the active users according to their requirement of length of spreading sequences from the smallest requirement to the largest one.

It has to be noted that the users having an identical requirement for each length are put in order according to the average direction of departure of the signals transmitted to them.

Following our example, users u1, u2, u3, u4 are then put in order as follow: u1, u4, u3 and u2.

At the following step S505, the processor 100 considers the first ordered user and obtains at step S506 its requirement in term of number U of spreading sequences and length of spreading sequences.

In our example, user u1 is the first ordered user and a unique spreading sequence of L/2 is required.

The processor moves to step S507 and assigns required spreading sequence to the first ordered user.

In our example, the processor then assigns a spreading sequence of L/2 length. If L=8 the processor assigns the four first coefficients of the first line noted 700 of the Walsh-Hadamard matrix 70 of the FIG. 7 to user u1. The Walsh-Hadamard matrix 70 is stored into the ROM memory 102. This Walsh-Hadamard matrix is in our example a matrix of eight lines and eight columns. It permits the assignment of eight spreading sequences of a maximum length of eight coefficients.

It has to be noted here that the first line or column of the Walsh-Hadamard Matrix is allocated to the first ordered user.

Next, processor 100 marks as unavailable at step S508, the lines of the Walsh-Hadamard matrix 70 which start by the spreading sequence assigned for user u1.

The lines noted 700 and 701 of the Walsh-Hadamard matrix 70, starting by the same four first coefficients as ones assigned to user u1, are then marked as unavailable.

At the following step S509, the processor 100 checks whether or not if, for all active users having the same requirement of the current required length of spreading sequence, one or more spreading sequences have been assigned.

According to our example, no spreading sequences have been assigned to user u4, processor 100 moves then to step S510.

At that step, the processor 100 considers the next ordered user and obtains at step S506 its requirement in term of number U of spreading sequences and length of spreading sequences.

The processor moves to step S507 and assigns required spreading sequence to the next ordered user.

In our example, the processor then assigns a spreading sequence of L/2 to user u4. If L=8, the processor 100 assigns the four first coefficients of the second line noted 702 of the Walsh-Hadamard matrix 70 of the FIG. 7 to user u4.

It has to be noted here that the first available line or column of the Walsh-Hadamard matrix is assigned to the second ordered user.

Next, the processor 100 marks as unavailable at step S508, the lines of the Walsh-Hadamard matrix 70 which start by the spreading sequence assigned for user u4. In our example the lines noted 702 and 703 of the matrix having the same four first coefficient as ones assigned to user u4 are then marked as unavailable.

At the following step S509, the processor 100 checks whether or not all required spreading sequences have been assigned to active users having the same requirement of the current required length.

According to our example, a spreading sequence has been assigned to all users requiring a spreading sequence of L/2, the processor 100 then moves to step S511.

At that step, the processor 100 checks if the length of the spreading sequence which has been assigned previously is equal to the maximum length of spreading sequence obtained at step S503.

In our example, the length of spreading sequence which has been assigned previously is lower than the maximum length of spreading sequence, the processor 100 then moves to step S510.

At that step, the processor 100 considers the next ordered user and obtains at step S506 his requirement in term of number U and length of spreading sequences.

In our example, user u3 is the next ordered user and a unique spreading sequence of L is required.

The processor 100 moves to step S507 and assigns required spreading sequence to the ordered user u3. In our example, with L=8 the processor 100 then assigns the eight coefficients of the third line noted 704 of the Walsh-Hadamard matrix 70 of the FIG. 7 to user u3.

It has to be noted here that the first available line or column of the Walsh-Hadamard matrix is assigned to the third ordered user.

Next, the processor 100 marks as unavailable at step S508, the lines of the Walsh-Hadamard matrix 70 which start by the spreading sequence assigned for user u3.

In our example the line noted 704 of the matrix having the same coefficients as ones assigned to user u3 is then marked as unavailable.

At the following step S509, the processor 100 checks whether or not if, for all active users having the same requirement of the current required length spreading sequence, one or more spreading sequences have been assigned.

According to our example, no spreading sequences have been assigned to user u2, processor 100 moves then to step S510.

At that step, the processor 100 considers the next ordered user and obtains at step S506 its requirement in term of number U of spreading sequences and length of spreading sequences.

The processor moves to step S507 and assigns required spreading sequence to the next ordered user.

Figures 7, 8:
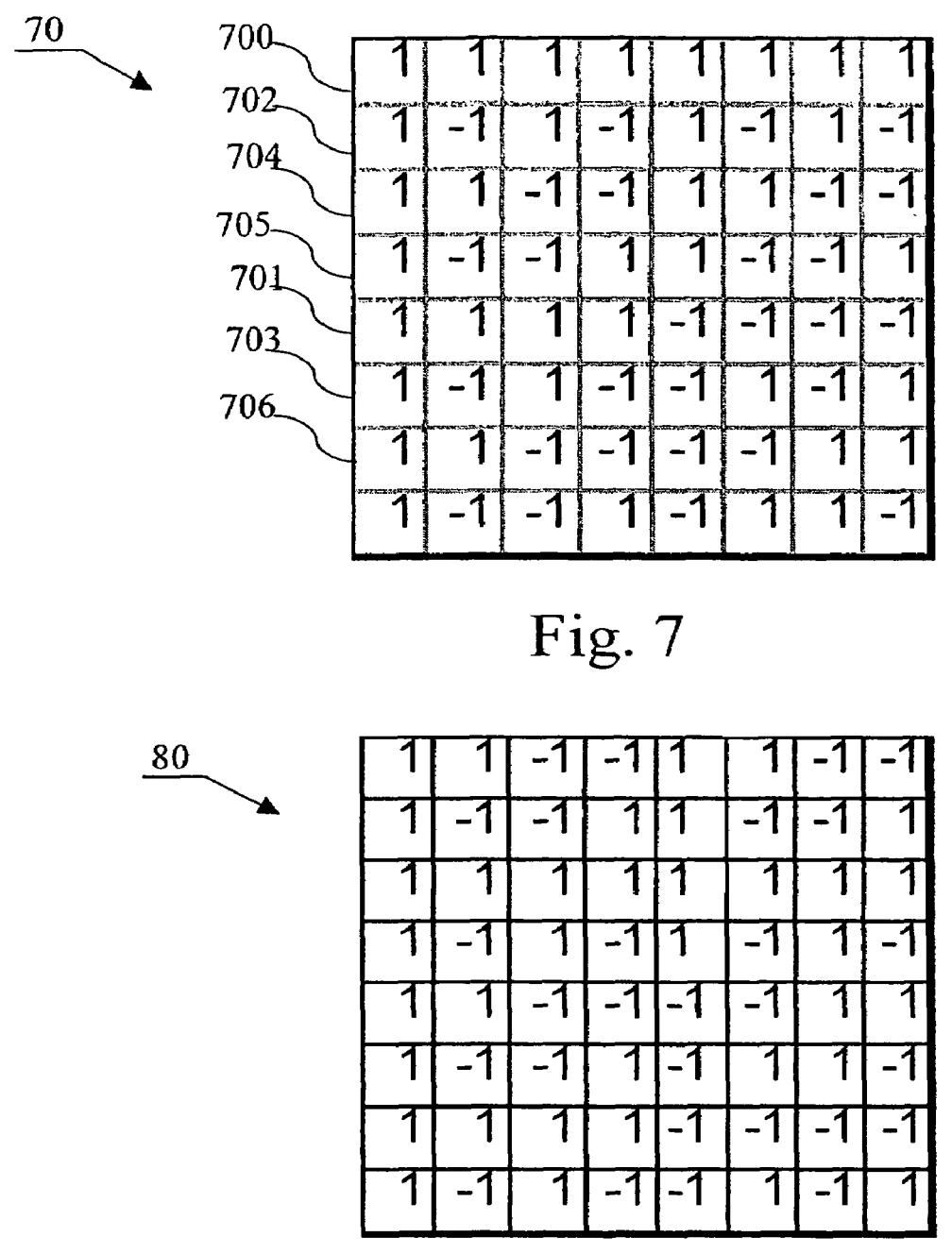

In our example, user u2 requiring two spreading sequences, the processor 100 then assigns two lines of the Walsh-Hadamard matrix 70 of the FIG. 7 to user u2.

Following our example, the lines 705 and 706 of the Hadamard-Hadamard matrix are then assigned to user u2. Lines 700, 701, 702, 703 and 704 marked previously as unavailable are not taken.

It has to be noted here that the first available lines or columns of the Walsh-Hadamard matrix are assigned to the fourth ordered user.

Next, the processor 100 marks as unavailable at step S508, the lines of the Walsh-Hadamard matrix 70 which start by the spreading sequence assigned for user u2.

In our example the lines noted 705 and 706 of the matrix having the same coefficients as ones assigned to user u2 are then marked as unavailable.

At the following step S509, the processor 100 checks whether or not if, for all active users having the same requirement of the current required length spreading sequence, one or more spreading sequences have been assigned.

According to our example, all required spreading sequences have been assigned to active users having same requirement of the current required length, the processor then moves to step S511.

At that step, the processor 100 checks if the length of spreading sequence which has been assigned previously is equal to the maximum length of spreading sequence obtained at step S503.

According to our example, the length of spreading sequence which has been assigned previously is equal to the maximum length of spreading sequence, the processor 100 ends then the algorithm.

It has to be noted here that the assignment of spreading sequences to users requiring smallest length prior to the assignment of spreading sequences to users requiring longer lengths can be also made in the algorithm as described in reference to FIG. 3.

Figure 6:
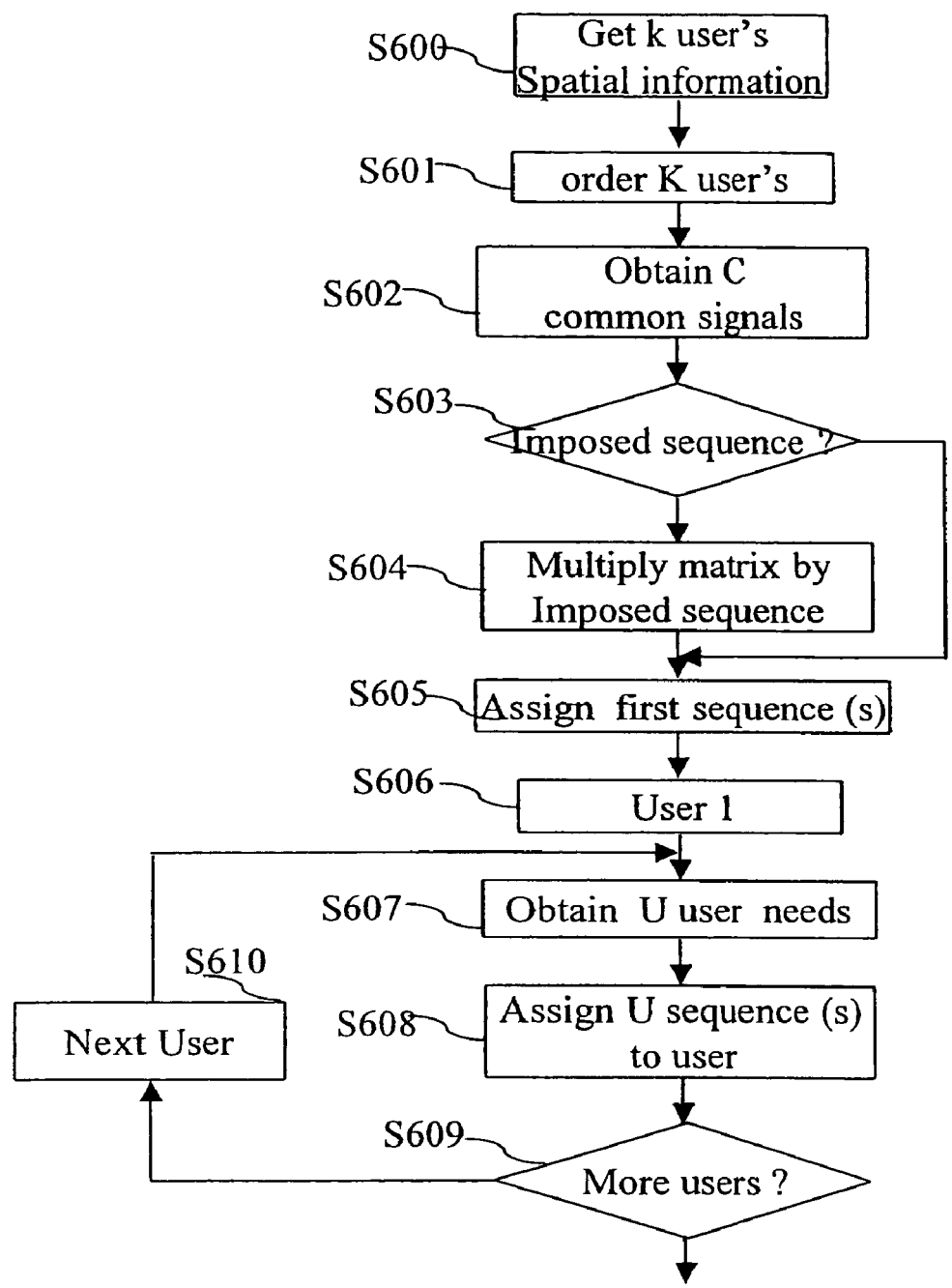
FIG. 6 is an algorithm for assigning one or more spreading sequences to each user of a Multi-Carrier transmission network according to a fourth embodiment of the present invention, implemented in the device of FIG. 1.

FIG. 6 is an algorithm for assigning one or more spreading sequences to each user of a Multi-Carrier transmission network according to a fourth embodiment of the present invention, implemented in the device of FIG. 1.

The code of this flow chart is for example stored in the ROM memory 102 of the device 10 of FIG. 1. When this device 10 is powered up, the code is loaded into the random access memory 103 and executed by the processor 100 of the device 10.

The algorithm of FIG. 6 is executed by the processor 100 under certain circumstances like in a Multi-Carrier network where no Orthogonal Variable Spreading Factors, multiple spreading sequences can be assigned to a user and common sequences are required in the present Multi-Carrier network.

Regularly or each time a new active user is registered on the Multi-Carrier base station or each time an active user becomes inactive or anytime one or more users have a new requirement in term of spreading sequence, the processor 100 executes the instructions associated to the algorithm described in the FIG. 6.

At step S600, the processor 100 receives from the unit for determining user's spatial information 106 the respective average direction of departure of the signals transmitted to each user.

Next step S601, the processor 100 puts in order the actives users according to the respective average direction of departure of the signals transmitted to each user.

At the following step S602, the processor 100 obtains the number C of common signals required for the Multi-Carrier network and the length of spreading sequences required for these signals.

Next, the processor 100 checks at step S603 if a common spreading sequence has to be assigned to common signals.

If no imposed common spreading sequence is required, the processor 100 moves to step S605.

If an imposed common spreading sequence is required, the processor 100 moves to step S604 and multiplies element by element each line of a Walsh-Hadamard matrix called hereinafter an original Walsh-Hadamard matrix by the imposed common spreading sequence and forms a new Walsh-Hadamard matrix called hereinafter an obtained Walsh-Hadamard matrix.

An original Walsh-Hadamard matrix $W_L$ of size L is defined by the following iterative rule:

$$W_1 = 1$$

$$W_L = \begin{bmatrix} W_{L/2} & W_{L/2} \\ W_{L/2} & -W_{L/2} \end{bmatrix}$$

It has to be noted here that the lines or the columns of an original Walsh-Hadamard matrix $W_L$ formed by that iterative rule are ordered in an order which is called the natural order of a Walsh-Hadamard matrix.

An obtained Walsh-Hadamard matrix is a matrix obtained by multiplying element by element each line or column of an original Walsh-Hadamard matrix by an imposed common spreading sequence. In such case, if lines of the original matrix are multiplied by an imposed common spreading sequence, the spreading sequences are included in the lines of the obtained Walsh-Hadamard matrix. If columns of the original matrix are multiplied by an imposed common spreading sequence, the spreading sequences are included in the columns of the obtained Walsh-Hadamard matrix.

An obtained Walsh-Hadamard matrix is also a matrix obtained by multiplying at least one line or one column of an original Walsh-Hadamard matrix or an obtained Walsh-Hadamard matrix as described previously, by at least one predetermined value such as a constant. In such case, if lines of the original matrix are multiplied by a constant, the spreading sequences are included in the lines of the obtained Walsh-Hadamard matrix. If columns of the original matrix or the obtained matrix as described previously are multiplied by a constant, the spreading sequences are included in the columns of the obtained Walsh-Hadamard matrix.

It has to be noted here that the lines or the columns of an obtained Walsh-Hadamard matrix $W_L$ are ordered in an order which is called the natural order of a Walsh-Hadamard matrix.

At step S604, if as example the maximum length L is equal to eight, the processor 100 multiplies element by element each line of the Walsh-Hadamard matrix 70 of the FIG. 7 stored into the ROM memory 102 by the imposed common spreading sequence and forms the new Walsh-Hadamard matrix 80 of FIG. 8.

As example, the Walsh-Hadamard matrix 70 is multiplied by the imposed common spreading sequence comprised in the line 704 of the Walsh-Hadamard matrix 70 and forms an obtained Walsh-Hadamard matrix 80 of FIG. 8.

The processor 100 then moves to step S605.

At step S605, the processor 100 assigns the spreading sequences contained in the C first lines of the Walsh-Hadamard matrix 70 to the common signals if no imposed spreading are required or assigns the spreading sequences contained in the C first lines of the Walsh-Hadamard matrix 80 to the common signals if an imposed spreading is required.

At the following step S606, the processor 100 consider the first ordered user and obtains at step S607 its requirement in term of number U of spreading sequences.

The processor moves to step S608 and assigns the next spreading sequence of the Walsh-Hadamard matrix to the first ordered user.

At the following step S609, the processor 100 checks whether or not if, for all active users, one or more spreading sequences have been assigned.

If some spreading sequences have not been assigned to an active user, processor 100 moves to step S610 and consider the next active user.

The loop made by steps S607 to S610 is executed by the processor 100 as far as spreading sequences have been assigned to all active users.

It has to be noted here that the assignment of imposed common spreading sequences to users can be also made in the algorithm as described previously in reference to FIG. 3.

It has to be also noted that the description of the algorithms of FIGS. 4, 5 and 6 has been made using lines of a Walsh-Hadamard matrix. Obviously, columns of a Walsh-Hadamard matrix can be used also in the present invention.

It has to be noted also here that instead of using Walsh-Hadamard spreading sequences, other kind of spreading sequences can be used in the present invention. As example, orthogonal complementary Golay sequences can be used also.

Naturally, many modifications can be made to the embodiments of the invention described above without departing from the scope of the present invention

The invention claimed is:

1. A method of assigning at a transmitter of a Multi-Carrier transmission network spreading sequences to users of the Multi-Carrier transmission network, each element of each spreading sequence being multiplied by a data item to be transmitted and then transmitted to a respective user on a corresponding sub-carrier, comprising:
   obtaining spatial information for each user of the Multi-Carrier transmission network,
   ordering the users according to the obtained spatial information from a smallest direction of departure/arrival to a largest direction of departure/arrival to produce a respective user order, and
   assigning one of a group of corresponding ordered spreading sequences to each user according to the user's respective order so that an ordered spreading sequence is assigned to a user having a smallest direction of departure/arrival, a next ordered spreading sequence is assigned to a user have a next smallest direction of departure/arrival, and a last ordered spreading sequence is assigned to a user having a largest direction of departure/arrival.

2. The method of claim 1, the step of obtaining spatial information comprising:
   measuring the spatial information of each user using a plurality of antennas.

3. The method of claim 1, wherein
   the step of ordering comprises ordering users requiring different lengths of spreading sequences by
      ordering users requiring a first common length of spreading sequences as a first group so that a first group first ordered spreading sequence is assigned to a first group user having a smallest direction of departure/arrival, and a first group last ordered spreading sequence is assigned to a first group user having a largest direction of departure/arrival, and
      ordering users requiring a second common length of spreading sequences as a second group so that a second group first ordered spreading sequence is assigned to a second group user having a smallest direction of departure/arrival, and a second group last ordered spreading sequence is assigned to a second group user having a largest direction of departure/arrival; and
   the step of assigning includes
      assigning ordered spreading sequences to the first group before assigning ordered spreading sequences to the second group.

4. The method of claim 1, the step of obtaining spatial information comprising:
   obtaining the spatial information from a transmitter antenna lobe diagram or from a Global Positioning System.

5. The method of claim 1, wherein the group of ordered spreading sequences is formed from a Walsh-Hadamard matrix whose lines or columns are in a natural order.

6. The method of claim 5, wherein the lines or columns of the Waish-Hadamard matrix are multiplied element by element by a predetermined common spreading sequence to form the group of ordered spreading sequences.

7. The method of claim 1, further comprising:
assigning at least one common sequence to the users, the common sequence being a first spreading sequence of ordered spreading sequences having a common length.

8. The method of claim 1, wherein the spatial information is one of an average direction of departure and a maximum direction of departure of signals transmitted to each user.

9. The method of claim 1, further comprising:
forming the group of ordered spreading sequences by minimizing a cost function representing an interference between a first spreading sequence and tuples of spreading sequences having a length determined to satisfy a user requirement.

10. The method of claim 9, further comprising:
defining tuples of the group of ordered spreading sequences from a subset of the group of ordered spreading sequences having a length determined to satisfy a user requirement, the tuples further defined according to user spatial information.

11. The method of claim 10, further comprising:
determining an interference level for subsets of spreading sequences by calculating an interference for each tuple of each subset of spreading sequences; and
identifying a subset of spreading sequences having a smallest interference as the group of ordered spreading sequences.

12. The method of claim 10, the step of determining an interference level comprising:
calculating a maximum interference for each tuple of each subset of spreading sequences.

13. The method of claim 1, wherein the Multi-Carrier transmission network is an Orthogonal Frequency and Code Division Multiplexing transmission Network.

14. The method of claim 1, wherein the Multi-Carrier transmission network is a Multi-Carrier Code Division Multiple Access transmission Network.

15. A device for assigning at a transmitter of a Multi-Carrier transmission network spreading sequences to users of the Multi-Carrier transmission network, each element of each spreading sequence being multiplied by a data item to be transmitted and then transmitted to a respective user on a corresponding sub-carrier, comprising:

a processor configured to obtain spatial information for each user of the Multi-Carrier transmission network,
a processor configured to order the users according to the obtained spatial information from a smallest direction of departure/arrival to a largest direction of departure/arrival to produce a respective user order, and
a processor configured to assign one of a group of corresponding ordered spreading sequences to each user according to the user's respective order so that an ordered spreading sequence is assigned to a user having a smallest direction of departure/arrival, a next ordered spreading sequence is assigned to a user have a next smallest direction of departure/arrival, and a last ordered spreading sequence is assigned to a user having a largest direction of departure/arrival.

16. A computer program stored in a computer memory and comprising instructions configured to cause a computing device to execute a method of assigning at a transmitter of a Multi-Carrier transmission network spreading sequences to users of the Multi-Carrier transmission network, each element of each spreading sequence being multiplied by a data item to be transmitted and then transmitted to a respective user on a corresponding sub-carrier, the method comprising:

obtaining spatial information for each user of the Multi-Carrier transmission network,
ordering the users according to the obtained spatial information from a smallest direction of departure/arrival to a largest direction of departure/arrival to produce a respective user order,
assigning one of a group of corresponding ordered spreading sequences to each user according to the user's respective order so that an ordered spreading sequence is assigned to a user having a smallest direction of departure/arrival, a next ordered spreading sequence is assigned to a user have a next smallest direction of departure/arrival, and a last ordered spreading sequence is assigned to a user having a largest direction of departure/arrival.

* * * * *